July 5, 1927.  
G. D. ANGLE  
1,635,023  
ENGINE CYLINDER VALVE PORT AND STEM GUIDE STRUCTURE  
Filed Dec. 30, 1920  
2 Sheets-Sheet 1
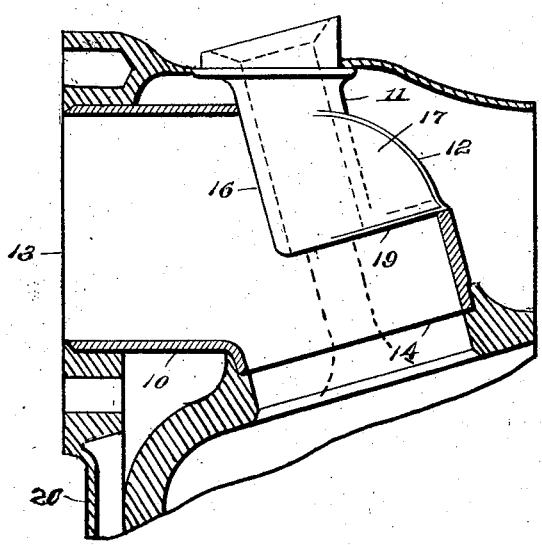
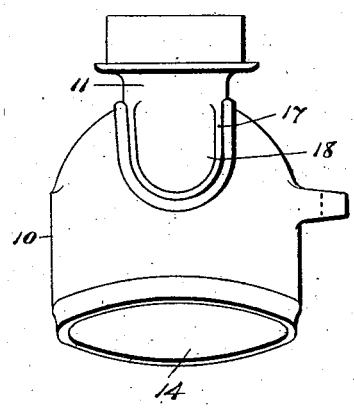
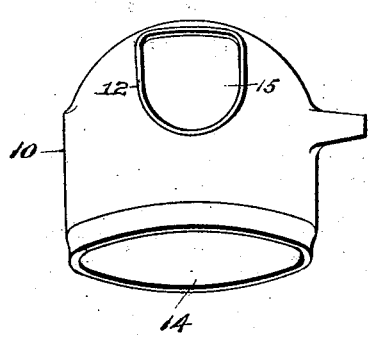
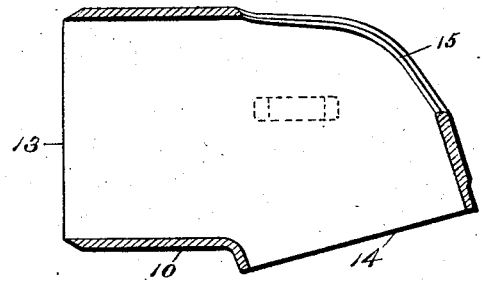
Inventor  
Glenn D. Angle  
By Robert H. Young  
Attorney July 5, 1927. 1,635,023
G. D. ANGLE
ENGINE CYLINDER VALVE PORT AND STEM GUIDE STRUCTURE
Filed Dec. 30, 1920   2 Sheets-Sheet 2
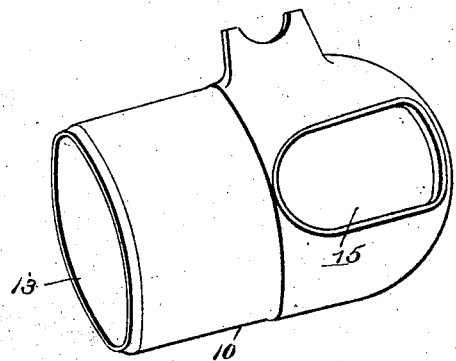
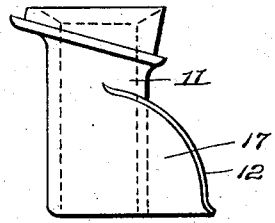 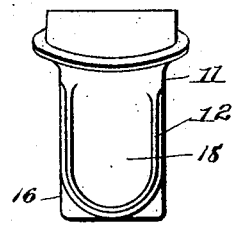
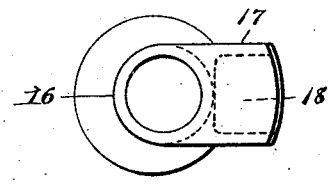

Patented July 5, 1927.

1,635,023

UNITED STATES PATENT OFFICE.

GLENN D. ANGLE, OF DAYTON, OHIO.

ENGINE-CYLINDER VALVE PORT AND STEM-GUIDE STRUCTURE.

Application filed December 30, 1920. Serial No. 434,132.

This invention relates to engine cylinder valve port and stem guide structures, the object in view being to improve the construction of such feature of an internal combustion engine—obtaining a free unobstructed flow of explosive mixture to the engine, and also enabling the valve stem guide element to be more efficiently cooled by subjecting the same thruout practically its entire length to the cooling action of the water.

The main difficulties found in valve port structures of steel cylinders for internal combustion engines are avoiding restrictions or obstructions to the free flow of mixture therethru, reduction of cross-sectional area due to protrusion of the valve stem guide, and obtaining water space sufficiently close to the valve stem guide or bushing to insure proper cooling of the valve.

Under the improved construction herein shown and described, the valve stem guide is made separately from the main body of the valve port structure and consists, in the preferred embodiment of the invention, of a steel forging which is welded, or otherwise permanently fastened in proper relation to the main body of the structure, after certain machine operations. This permits the main body to be finished inside with a round ended mill, thus producing a radius bend in said main body. The valve stem guide is so made that the portion thereof extending into the main body is of a shape not to seriously restrict or obstruct the gas flow, and it is also designed to be exposed externally to the cooling action of the water thruout practically its entire length.

While the design herein illustrated is adapted to have the cooling water contact therewith on one side only, the cooling surface may easily be made to extend over the greater part of the guide and in fact, over the entire outer surface thereof is required.

With the above and other objects in view, the invention consists in the novel construction, combination, and arrangement herein fully described, illustrated and claimed.

In the accompany drawings:

Fig. I is a section thru the valve port and stem guide structure taken diametrically of the main body thereof and showing the stem guide element in elevation.

Fig. II is a view looking toward one end thereof.

Fig. III is a view similar to Fig. II, omitting the valve guide element.

Fig. IV is a view similar to Fig. II, omitting the valve guide element.

Fig. V is a perspective view of Fig. III.

Fig. VI is a side elevation of the valve guide.

Fig. VII is an end view thereof.

Fig. VIII is a view looking toward the inner end of the valve stem guide.

The improved engine cylinder valve port and stem guide structure is made in two parts, each of which is subjected to certain machine operations before the two members are brought into proper relation to each other. 10 designates the main body member, while 11 represents the stem guide member or element. The main body member or element is of tubular formation and is composed preferably of a steel forging which is subsequently finished internally by means of a round headed hemispherical milling cutter. This produces a radius bend corresponding for the purpose of illustration with the line 12 in Fig. I, the milling cutter being inserted first thru the inlet end 13 of the body 10, and being inserted subsequently thru the outlet orifice 14 of the said main body 10.

In a subsequent operation, a receiving orifice 15 is formed in the outer wall of the radius bend as shown—for example—in Figures 3, 4 and 5, the latter being designed to receive and permanently hold in place the valve stem guide element 11. The valve stem guide comprises a main tubular body with central bore 16, which is rebored to the proper size, and along the proper axis after the two parts of the complete structure are permanently united.

The member 11 has wings 17 projecting therefrom in spaced relation to each other to form a water cooling pocket 18, which allows water to come directly in contact with the tubular body portion of the valve stem guide. A wall 19 cuts off communication between the inner end of the pocket 17 and the interior of the tubular body 10. A water enclosing jacket 20 extends around and is welded to various points of the main body member 10.

By means of the construction herein above described, both of the members or elements of the structure, are formed separately and may therefore be properly milled or otherwise treated before they are brought into combination. It is intended to weld such parts together altho any other method of permanently attaching said parts together may be utilized.

It will be readily seen as compared with the ordinary construction, the flow of mixture thru the structure is greatly facilitated as there are no abrupt angles or pockets to obstruct the flow. The valve guide body, which protrudes into the tubular body 10, has a half round face to meet the inflowing gas; while at opposite sides of the body 11, there are quadrant shaped spaces for the gas flow which spaces have their outer walls curved coincident with the curvature of the outer wall of the radius bend herein above referred to. This results in keeping the valve cool as the valve guide is subjected to the cooling action of the inflowing mixture as well as the cooling water which contacts with the body of the valve stem guide thruout practically the whole length thereof.

I claim—

1. An engine cylinder valve port and stem guide structure, comprising a tubular main body having a radius bend and a reception orifice in the outer wall of such bend, a valve stem guide formed separately from said main body and having a water receiving and cooling pocket cast integral therewith, said guide being inserted through said orifice and permanently attached to said main body in such a manner that the water pocket is wholly within the confines of said radius bend and in conformity with the contour thereof.

2. An engine cylinder valve port and stem guide structure, comprising a tubular main body and having a radius bend and a reception orifice in the outer wall of such bend, a valve stem guide formed separately from said main body and having a water receiving and cooling pocket cast integral therewith, said guide being inserted through said orifice and permanently attached to said main body in such a manner that the water pocket is wholly within the confines of said radius bend and in conformity with the contour thereof, said guide having its wall exposed to the cooling action of water throughout substantially its entire length.

3. An engine cylinder valve port and stem guide structure, comprising a tubular main body having a radius bend and a reception orifice in the outer wall of such bend, and a valve stem guide formed separately from said main body and permanently fastened in said orifice, said guide having attaching wings in spaced relation to each other to form an intervening water-receiving and cooling space to admit water to the wall of the guide within the confines of the radius bend.

4. An engine cylinder valve port and stem guide structure, comprising a tubular main body having a radius bend and a reception orifice in the outer wall of such bend, and a valve stem guide formed separately from said main body and permanently fastened in said orifice, leaving on opposite sides of the valve guide quadrant shaped gas flow spaces with walls having the curvature of said radius bend.

In testimony whereof I have affixed my signature.

GLENN D. ANGLE.